United States Patent [19]

Antonazzi et al.

[11] 4,422,125

[45] Dec. 20, 1983

[54] PRESSURE TRANSDUCER WITH AN INVARIABLE REFERENCE CAPACITOR

[75] Inventors: Frank J. Antonazzi; David H. Ohnesorge, both of South Bend, Ind.

[73] Assignee: The Bendix Corporation, Southfield, Mich.

[21] Appl. No.: 380,647

[22] Filed: May 21, 1982

[51] Int. Cl.³ ............................................... H01G 7/00
[52] U.S. Cl. .................................... 361/283; 73/718
[58] Field of Search ........................... 361/283; 73/718

[56] References Cited

U.S. PATENT DOCUMENTS

| 4,064,550 | 12/1977 | Dias et al. | 361/283 |
| 4,274,125 | 6/1981 | Vogel | 361/283 |
| 4,380,041 | 4/1983 | Ho | 73/718 X |

*Primary Examiner*—Donald A. Griffin
*Attorney, Agent, or Firm*—William A. Marvin; Ken C. Decker

[57] ABSTRACT

A quartz capacitive pressure transducer including a sensing plate and a reference plate disposed on one quartz substrate which are opposed across a gap by a common plate on another quartz substrate to form capacitances. The substrates are maintained in their opposing relationship by an annular frit which seals a chamber between the substrates to a reference pressure. The reference plate is disposed in the area occupied by the frit annulus to provide a reference capacitance that has a zero pressure gradient.

7 Claims, 8 Drawing Figures

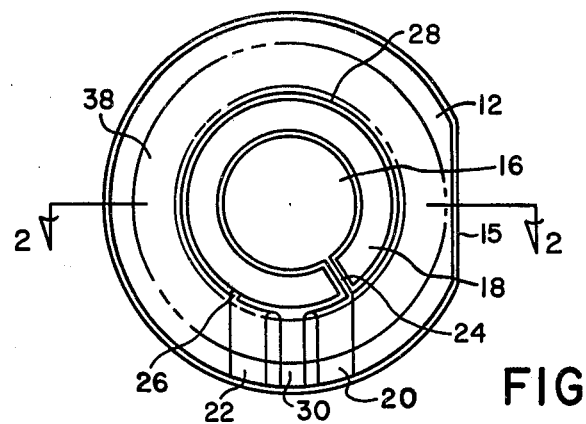
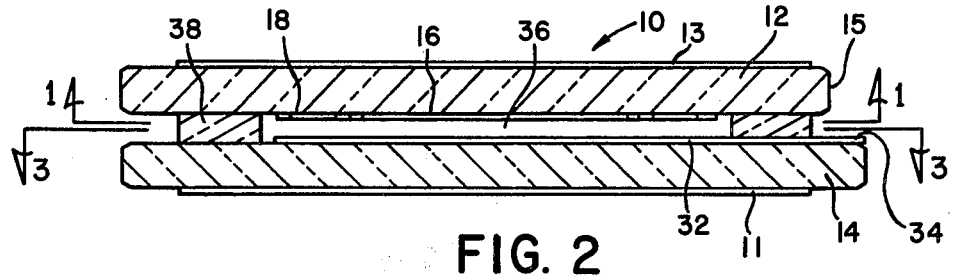
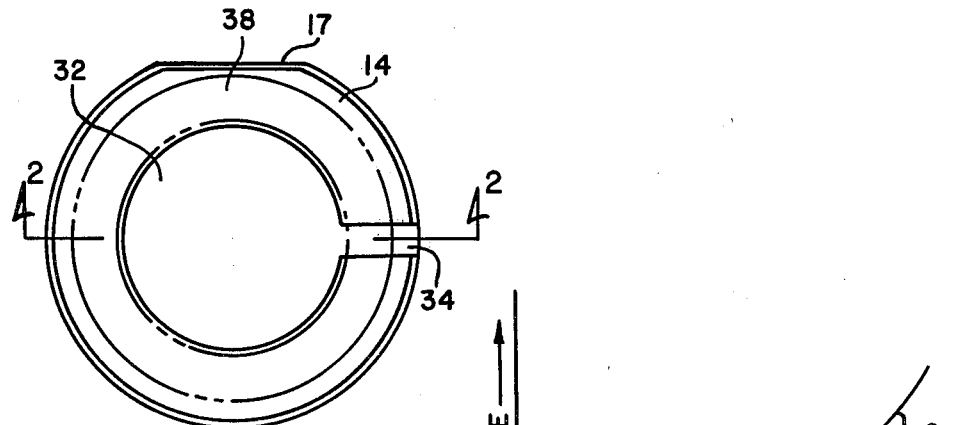
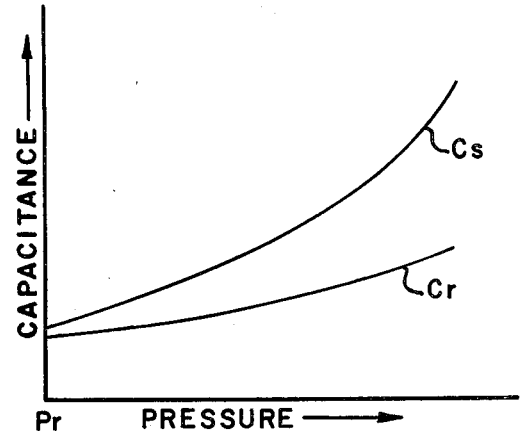

PRESSURE TRANSDUCER WITH AN INVARIABLE REFERENCE CAPACITOR

The invention relates to a pressure transducer with an invariable reference capacitor and, more particularly, to a pressure transducer of the quartz capacitive type.

Pressure transducers of the quartz capacitive type have advantageously been used in many highly accurate pressure measuring systems. Their relatively low temperature coefficient of expansion, nearly nonexistent hysteresis characteristics, and mechanical ruggedness all lend themselves to applications where other transducers would experience high rates of failure. Particularly, in electronic fuel control systems for gas turbine engines of aircraft, pressure measuring systems using capacitive transducers of this type have proven themselves reliable and superior in measurement accuracy.

The most common configuration for a pressure transducer of the quartz capacitive type is a dual quartz diaphragm separated by a gap. Each diaphragm is typically a quartz disc upon which there has been deposited one or several capacitor plates or conductive areas. When separated by an annular frit the opposed conductive areas form a capacitance which can be varied by deflecting the diaphragm members by means of a pressure change. Specifically, in one configuration, a circular-shaped "sensing" capacitor plate centrally located on one diaphragm is surrounded by a ring-shaped "reference" capacitor plate. The plates are opposed by a single circular-shaped "common" capacitor plate disposed on the other diaphragm to form two capacitances, termed the "sensing" and "reference" capacitance, between the opposing diaphragms.

This transducer configuration with one or more sensing capacitors and one or more reference capacitors can be used in a number of different pressure measuring systems to provide advantageous results. Conventionally, in these systems measurements are made of either the difference or the ratio of the two capacitances. A pressure ratio measuring system of this type is more fully disclosed in a commonly assigned co-pending U.S. patent application Ser. No. 280,578, entitled "Pressure Ratio Measurement System" filed on July 6, 1981, in the names of Antonazzi et al.; the disclosure of which if hereby expressly incorporated by reference herein. A differential pressure measuring system of this type is more fully disclosed in a commonly assigned co-pending U.S. patent application Ser. No. 244,184 entitled "Differential Pressure Measuring System", filed on March 16, 1981, in the names of Bluish, et al.; the disclosure of which is hereby expressly incorporated by reference herein.

In the first system when the reference plate and the sensing plate are excited by alternating signals which are 180° out of phase, the common plate will develop a signal current which is proportional to the difference between the sensing capacitance and the reference capacitance. The reference capacitance is designed to approximate the sensing capacitance at an intitial or reference pressure and thereby cancel this initial capacitance of the transducer. In this manner the capacitance output from the sensor for the initial reference pressure appears to be zero.

Because the reference capacitor plate is located on the outer periphery of the diaphragm, it has a much smaller pressure gradient (change in capacitance with a change in pressure) than does the sensing plate which is located in the relatively deflectable central area of the diaphragm. When the gradients are differenced, the gradient from the sensing capacitance overrides the smaller reference gradient. The current signal output from the common plate therefore varies substantially as the gradient of the sensing plate. This provides a configuration in which the signal current varies from zero or a very small value at the initial pressure to a maximum value substantially in accordance with the pressure gradient of the sensing capacitance.

In the second or ratio type of system, the reference and sensing plates are again excited by alternating signals which are 180° out of phase. Additionally, the difference current signal output from the common plate is utilized as a control signal to an integrator which varies the amplitude of the reference plate excitation in a direction to null the difference. The output of the integrator in this configuration for a steady state difference signal of zero is the ratio of the sensing capacitance over the reference capacitance.

Similarly, to the differencing system, the reference capacitor has a much smaller pressure gradient than does the sensing capacitor. Therefore, the signal output from the integrator varies substantially as the pressure gradient of the sensing plate times the factor $1/C_r$ where $C_r$ is the capacitance of the reference capacitor. If the reference capacitor is equivalent to the sensing capacitance at some initial pressure, this configuration will provide a signal which varies from one at the initial pressure to a small value substantially in accordance with the pressure gradient of the sensing capacitance.

However, because the reference capacitance does vary somewhat with pressure, the output signal for both systems is a function of the reference capacitor pressure gradient. This dependency, although small, produces capacitance measurement difficulties and makes the total capacitance function highly nonlinear. The primary cause of the nonlinearity is the effect of temperature on the spring rate of the quartz which changes the pressure versus capacitance gradients for both the sensing and reference capacitances. The two capacitances occupy different areas on the diaphragm wth the sensing area being more flexible than the reference area. Therefore, the gradient changes for each capacitance because of the temperature variation will not be similar because of the different deflection characteristics of the areas.

Thus, to define the capacitance output of the transducer for either system to the accuracies desired for gas turbine engine control, a substantial number of calibration measurements must be taken. This process adds considerable time to the manufacturing and testing process for the transducers and can account for more than 50% of the cost of the capsule.

An additional problem caused by the reference capacitor pressure gradient for the ratio system is a variable settling time. Since the reactance of the feedback loop varies with the parameter to be measured, the loop gain and consequently, the loop settlement time is also dependent thereon. Compensation of other elements in the loop must be made to correct the overall loop gain for these systems to retain a constant settlement time at the expense of extra circuitry.

Further, for ratio measurement, a transducer system having an output that varies from a small number to one rather than vice-versa, would be more advantageous. This would permit the output of the system to vary directly with the parameter to be measured instead of its inverse. This is difficult to accomplish in the present system because of the size of the reference capacitance in relation to the sensing capacitance. The larger the reference capacitance is made, the smaller and less sensitive the sensing capacitance becomes for the same overall area.

Therefore, it would be highly desirable to provide a quartz capacitive transducer with a reference capacitor which has an increased invariablity with respect to pressure and temperature to alleviate these problems.

SUMMARY OF THE INVENTION

Accordingly, the invention provides a pressure transducer with an invariable reference capacitor comprising first and second substrates of insulative material, preferable quartz, wherein at least one of the substrates is flexible and deforms in response to a pressure change, the first and second substrates positioned from each other such that a gap exists between the substrates, an annular frit having a dielectric constant substantially in excess of one, and forming a chamber by sealing the opposed substrates which is referenced to an initial pressure, at least one sensing capacitor plate of a conductive material disposed on one of the substates which is located entirely within the chamber, at least one reference capacitor plate of a conductive material disposed on the one substrate and located entirely in the annular area defined by the frit, and at least one common plate formed of a conductive material disposed on the other substrate and located partially within the chamber and partially within the annular area defined by the frit to provide a sensing capacitance between the sensing plate and common plate and a reference capacitance between the reference plate and common plate.

The invention therefore provides a quartz capacitive transducer having reference and a sensing capacitor where the reference capacitor plate is disposed in the diaphragm area overlayered with the annular frit.

This transducer configuration has several advantages over prior quartz capacitive transducers. Primarily, it provides a transducer with a pressure invariable reference capacitance which is additionally integral with the capsule. Since the reference capacitor is no longer in the deflectable region of the quartz diaphragm, the entire deflecting area may be used for one or more sensing capacitors. Additionally, by locating the reference capacitor in the frit or nondeflecting area the gradient of capacitance versus pressure for the reference capacitor will be reduced to nearly zero. Both of these advantages result in an overall higher gradient for a differential signal (sensing minus reference) which can be utilized to either increase the accuracy-resolution characteristic of the transducer or to decrease the size and weight of the capsule (or a combination of both). For a ratio system, the reduction of the reference capacitor pressure gradient eliminates the need for loop gain compensation.

Moreover, the dielectric constant of the vitreous frit material used in quartz pressure transducers is much greater than one and, depending on the actual material, can be between 4–10 times that of a vacuum. Therefore, the area needed for the reference capacitance can be reduced by a factor proportional to the gain in the dielectric constant while still maintaining a desired capacitance level. Any savings in the plate area of this transducer, as was mentioned above, can be directly translated into either an increase in the accuracy-resolution characteristic or a size and weight savings. Further, in a ratio system, the reference capacitor can easily be made several times as large as the initial value of the sensing capacitance. This configuration will provide in a facile manner an output that varies from a small number to one as the pressure varies from its minimum to maximum.

Most importantly, since the reference capacitor does not change with pressure, it thus does not change nonlinearly with temperature. The output signal from either system is not a function of the reference capacitance pressure gradient. This means that fewer calibration measurements need to be taken to define the sensor characteristics over a desired pressure range. This is because the calibration can be made for one variable (sensing capacitance) with respect to a constant (reference capacitance) instead of for the difference or ratio of two nonlinear variables which are both pressure and temperature dependent.

These and other objects, features, and aspects of the invention will be more clearly understood and better described if a reading of the detailed description is undertaken in conjunction with the appended drawings wherein:

BRIEF DESCRIPTION OF THE DRAWINGS

FIG. 1 is a bottom view of the upper substrate of a quartz capacitive pressure transducer according to the prior art which illustrates the placement of the sensing and reference capacitance plates;

FIG. 2 is a cross-sectional side view of the quartz capacitive transducer whose upper substrate is illustrated in FIG. 1;

FIG. 3 is a top view of lower substrate of the quartz capacitive transducer illustrated in FIG. 2 which shows the placement of a common capacitor plate;

FIG. 4 is an illustrative pictorial of a graphical representation of capacitance as a function of pressure for the sensing and reference capacitances of the transducer illustrated in FIGS. 1, 2, and 3;

DETAILED DESCRIPTION OF THE PREFERRED EMBODIMENT

Figure 5:
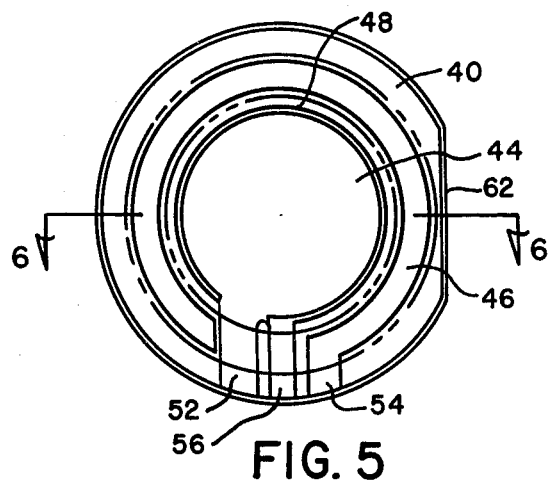
FIG. 5 is a bottom view of the upper substrate of a quartz capacitive pressure transducer constructed in accordance with the invention which illustrates the placement of the sensing and reference capacitor plates.

A prior art quartz capacitive transducer illustrated in FIGS. 1–3 will now be described in order to provide a point of comparison for the invention. In FIG. 2 there is shown in cross section a transducer capsule generally designated 10 comprised of two quartz plates forming upper and lower substrates 12, 14 respectively. The substrates have been cut in a conventional manner from a rod-shaped quartz blank so that their final form is a disc. Preferably, each substrate may also be provided with a cutout or notch 15, 17 to provide easier access for the transducer terminals.

On each substrate 12, 14 there has been disposed conductive areas which are to provide charge retention areas or the plates of a capacitor. The upper substrate 12 which is better illustrated in FIG. 2 has disposed thereon a circular-shaped conductive area or plate 16 which forms a sensing capacitor plate and a ring-shaped conductive area or plate 18 which forms a reference capacitor plate. The conductive areas 16, 18 are electrically connected to terminal areas 20, 22 by conductive bridges 24, 26, respectively. Further disposed on the substrate 12 is a conductive path 28 that forms an internal ground screen 28 around the reference plate 16 and between it and the sensing plate 16. The ground screen 28 is electrically coextensive with its own conductive terminal area 30. Similarly, disposed on the substrate 14, which is better illustrated in FIG. 3 is a circular-shaped conductive area or plate 32 which forms a common capacitor plate. The common plate 32 is electrically coextensive with a conductive terminal area 34.

The conductive areas can be disposed or plated on the substrates 12 and 14 by various methods such as screen printing, vapor deposition, sputtering, or the like. Usually, the conductive material that forms the plates can comprise any of the noble metals, such as gold, silver, platinum, etc, but is not limited thereto.

To form the relatively complex pattern on the upper substrate 12, the conventional method is to initially screen print a conductive slurry in a single contiguous circular-shaped application including the terminal areas 20, 22, and 30 onto the substrate. The slurry is adhered to the substrate by heating during a drying process which bakes the conductive material onto the substrate in a thin layer. Thereafter a laser or other radient energy source is used to separate the single area into the three separate conductive patterns (16, 18, 28) by burning an insulative path between the areas in the shape illustrated.

The sensing plate 16 is located centrally on the substrate 12 and is substantially circular in shape while the reference plate 18 surrounds the outer periphery of the sensing plate and is substantially ring shaped. The ground screen 28 outlines the two capacitor plates and separates them by a thin conductive path that will shunt self interference to ground. The common plate 32 is substantially circular in shape and centrally located on the substrate 14. The area of the common plate 32 is generally designed to be substantially equivalent to that of the combination of the sensing and reference plate 16, 18.

A quartz capacitive transducer is produced from the two substrates and conductive areas by placing the substrates and thus the capacitor plates in opposition to each other across a gap 36. The gap 36 is maintained by an annular frit 38 that is screen printed on one of the substrates during assembly.

The frit material, prior to capsule formation, is preferably a granular glass material mixed with a binder to form a slurry for the screen printing process. After screen printing the frit annulus onto one substrate, the two substrates are aligned in a registration fixture to provide the correct gap distance and plate opposition pattern. The binder material of the frit is subsequently burned off by heating the capsule which additionally melts the granules of the frit material into an amorphous vitreous ring. While the frit is cooling to the vitreous stage, the frit material bonds to the substrates 12, 14 and seals the chamber formed by the area within the frit annulus. The frit material is chosen to have a similar temperature expansion coefficent to that of the quartz substrate. If it is desired to fix a reference pressure within the chamber, the assembly process and heating can be accomplished within a pressurized environment prior to sealing.

A process for manufacturing quartz capacitive transducers in the manner just described is more fully disclosed in a U.S. Pat. No. 4,288,835 issued Sept. 8. 1981, to Lee at al. which is commonly assigned with the present application. The disclosure of Lee et al is hereby expressly incorporated by reference herein.

When the capsule 10 is assembled in this manner and with the conductive patterns illustrated, the sensing plate 16 in opposition to the common plate 32 forms a sensing capacitor Cs and the reference plate in opposition to the common plate forms a reference capacitor Cr. The location and shape of each capacitor determines its pressure versus capacitance characteristic. The sensing capacitor Cs which has a centrally located plate 16 in the highly deflectable region of the substrate 16 exhibits a relatively high pressure versus capacitance gradient while the reference capacitor Cr which has a peripherally located plate in the less deflectable region of the substrate 16 exhibits substantially less of a pressure versus capacitance gradient.

Typical curves for these capacitance versus pressure gradients are illustrated in FIG. 4 where the capacitance for each capacitor Cs, Cr is graphically represented as a function of pressure. It is evident from the curve for the capacitor Cs that the capacitance has an initial value (set by the reference pressure) which nonlinearly increases with increasing pressure. The nonlinear increase is due to the gap distance varying over the area of the sensing plate in a nonlinear manner. Similarly, the reference capacitor Cr has a curve which intercepts the ordinate axis at an initial capacitance substantially equivalent to the initial capacitance of the reference capacitor Cr and then nonlinearly increases for increasing pressure, but with a substantially lower gradient that the sensing capacitor Cs.

In a differential system when these two characteristic curves are differenced by the common plate, the result is a curve which exhibits a substantially zero capacitance at the initial pressure Pr and a highly nonlinear increasing gradient of capacitance versus pressure. The result is a complex nonlinear difference function which is difficult to describe easily by conventional approximation techniques. For a ratio system a similar result is obtained where the result is a curve which exhibits a small initial number and a highly nonlinear increasing gradient of capacitance versus pressure.

Therefore, during the calibration process for either of these systems a relatively large number of data points must be taken to adequately describe the function. This is true whether the function is calibrated by storing a schedule of the data points measured as a function of pressure in a ROM or other memory device or whether from the data a curve fitting process is accomplished to approximate the data points.

If a curve fitting process is undertaken, it is known that the highly nonlinear difference or ratio functions can be approximated by a series summation of powers of the temperature and pressure variables by judiciously choosing the coefficients of each term of the summation. However, for greater accuracy in the process more terms have to be used the more nonlinear the original function happen to be.

Figure 6:
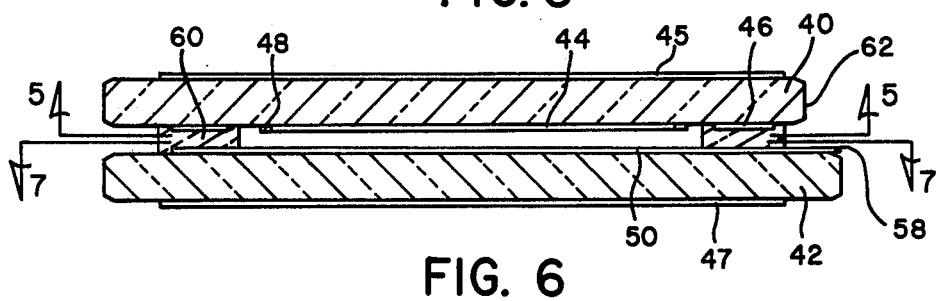
FIG. 6 is a cross-sectional side view of the quartz capacitive transducer whose top substrate is illustrated in FIG. 4.
Figure 7:
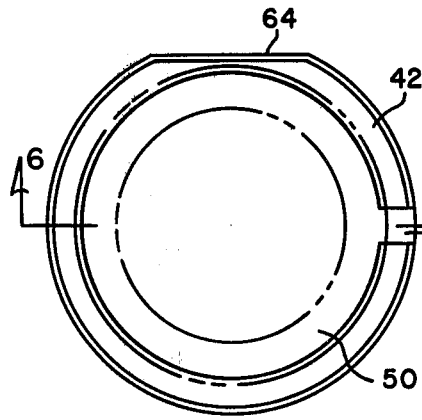
FIG. 7 is a top view of the lower substrate of the quartz capacitive transducer illustrated in FIG. 6 which shows the placement of a common capacitor plate.

The invention as illustrated in a preferred embodiment in FIGS. 5–7 provides an elegant solution to the calibration process problem. By making the reference capacitance invariable with respect to pressure, the resulting function, as will be more fully explained hereinafter, can be made more linear and easier to approximate with fewer data measurements.

With reference now to FIGS. 5, 6, and 7 there is disclosed a quartz capacitive pressure transducer having quartz substrates 40, 42 that are identical in size, shape, and characteristics, to those described for the capsule illustrated in FIGS. 1–3. The upper substrate 40 has disposed thereon conductive areas forming a sensing capacitor plate 44, a reference capacitor plate 46, and an internal ground screen 48. The lower substrate 42 has disposed therein a conductive area forming a common capacitor plate 50. The plates 44, 46, 48, and 50 are electrically contiguous with conductive areas forming terminals 52, 54, 56, and 58, respectively. Cutouts 62, 64 are machined in the plates 40, 42, respectively, to allow access to the terminal areas when the capsule is assembled. From these components, a pressure transducer is formed by joining the two substrates 40, 42 in opposing relationship by an annular frit seal 60. The chamber 66, as previously described, may be referenced to an initial pressure Pr. An external ground screen formed of conductive layers 45, 47 printed on the outside surfaces of substrates 40, 42, provides electromagnetic shielding for the transducer.

The sensing plate 44 is similar in shape, material, and location to the sensing plate 16 described for the transducer of FIGS. 1–3 but is larger in plate area for the same size of transducer. This is because the entire deflecting chamber area is now reserved for the sensing capacitance. This produces a larger pressure gradient for the same size of transducer and more accuracy or resolution. The reference plate 46 is ring shaped as was the reference plate 18, but is now disposed on the surface of substrate 40 between the boundaries of the frit annulus as shown by the dotted areas.

By the boundaries of the frit annulus, we mean that area on the surface of substrate 40 which is overlayered with frit material. In this area, the dielectric constant of the frit material is much greater than that of a vacuum or one. In fact, because the frit is a vitreous or glassy substance of excellent insulating quality, it generally has between 4–10 times the dielectric strength of the gap or a vacuum. Preferably, a frit with the highest dielectric strength, consistent with the desired temperature characteristics, is used. The frit material disclosed in the reference Lee et al. patent is a preferred choice. Because of the high dielectric constant, the area the reference capacitance occupies can be reduced.

This is advantageous in that the reference capacitance can be made long and narrow while still being equivalent to the initial capacitance of the sensing capacitor for the differential system. For the ratio system, the high dielectric constant multiplier permits the reference capacitance to be several times the initial value of the sensing capacitance without difficulty.

The reason that the reference plate should be long and narrow is that, as much as possible, it should be kept away from the inner and outer edges of the frit area. The inner edge is an area in which slight deformation of the quartz may still take place and the outer edge is the boundary of the frit seal. A metalization to glass (frit) seal on the outside edge is not considered as good as a quartz to glass (frit) seal. Further, migration of any contaminates, because of the inner vacuum, usually occurs from this edge toward the middle. The common plate 50 is located and shaped similarly to the common plate 32 but is now larger and overlaps the chamber into the frit annulus to the same extent as reference plate 46.

The process and materials for forming the conductive areas and joining the two substrates by the frit 60 are preferably those described previously with respect to Lee et al. and the transducer illustrated in FIGS. 1–3.

Figure 8:
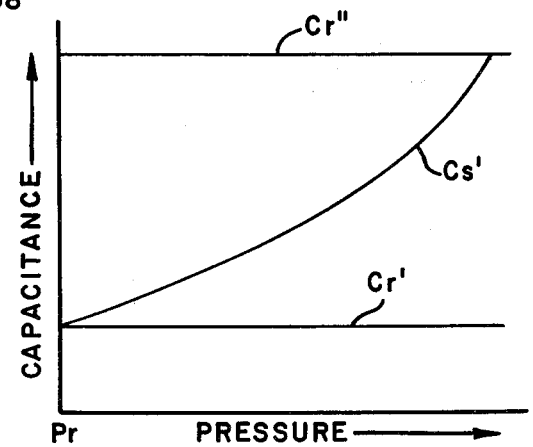
FIG. 8 is an illustrative pictorial of a graphical representation of capacitance as a function of pressure for the sensing and reference capacitance of the transducer illustrated in FIGS. 5, 6, and 7.

In FIGS. 5, 6, and 7 it is evident that the sensing plate 44 will form a capacitance $Cs'$ with the common plate 50 and the reference plate 46 will form a capacitance $Cr'$ or $Cr''$ with the common plate 50. Either the capacitance $Cr'$, $Cr''$ can be formed depending upon the area chosen for plate 46. The gradients of the capacitances $Cs'$, $Cr'$ or $Cr''$ with respect to pressure are illustrated in FIG. 8. The capacitance $Cs'$ because of the shape and location of plate 44 has a substantially similar but larger pressure gradient to the capacitance Cs in FIG. 4. It initiates at a reference pressure Pr and increases nonlinearly with increasing pressure. The capacitances $Cr'$, $Cr''$ however, are dissimilar to the capacitance Cr in FIG. 4 in that there is no pressure gradient to the curves. Because there is no pressure gradient, the capacitances $Cr'$, $Cr''$ additionally do not exhibit a nonlinear temperature dependence. At most, the temperature dependence of the reference capacitors $Cr'$, $Cr''$ will be substantially linear with the change in frit thickness (slight decrease for increasing temperatures).

This is the result of not only placing the plate 46 further away from the more deflectable center regions of the substrate 40 but also placing the plate in the area covered by the frit annulus. The frit annulus area is the support region for the bending and deflection of the substrates 40, 52. Therefore, it is not just relatively non-deflecting, but almost totally nondeflecting because of the stationary base of the frit annulus.

It should be pointed out that the reference capacitance $Cr'$ is most advantageously used with $Cs'$ when a differential system is contemplated for the transducer. In that system the difference $Cs'-Cr'$ will vary for zero or a small to a maximum value as the pressure varies from a minimum to a maximum. Conversely, the reference capacitance $Cr''$ is most advantageously used with $Cs'$ when a ratio system is contemplated for the transducer. In that system the ratio $Cs'/Cr''$ will vary from a very small number to a value of one as pressure varies from a minimum to a maximum.

While a preferred embodiment of the invention has been shown and described, it will be obvious to those skilled in the art that various modifications and variations may be made thereto without departing from the spirit and scope of the invention as defined in the appended claims.

What is claimed is:

1. A pressure transducer with an invariable reference capacitor comprising:
   a first substrate of insulative material and a second substrate of insulative material;
   wherein at least one substrate is flexible and will deform in response to a pressure change;
   wherein said substrates are positioned to oppose each other across a gap;
   an annular frit joining said substrates and forming a chamber between them by sealing said gap to a reference pressure, said annular frit comprising an insulative material with a dielectric constant in excess of one;
   at least one sensing capacitor plate formed of a conductive material disposed on one of the substrates and located entirely within the area defined by said chamber;

at least one reference capacitor plate formed of a conductive material disposed on said one substrate and located entirely within the annular area defined by the frit;

at least one common plate formed of a conductive material disposed on said other substrate and opposing said sensing plate in the area defined by said chamber to provide a sensing capacitance between said one common plate and said sensing plate; and another common plate formed of a conductive material disposed on said other substrate and opposing said reference plate in the area defined by the frit annulus to provide a reference capacitance between said other common plate and said reference plate.

2. A pressure transducer as defined in claim 1, wherein:

said one common plate and said other common plate form a contiguous conductive area located partially within the area defined by said chamber and partially within the area defined by said frit annulus.

3. A pressure transducer as defined in claim 2, wherein:

said sensing capacitor plate and said reference capacitor plate is separated by a conductive area forming a ground screen which is adapted to be electrically connected to the same potential as said common plate.

4. A pressure transducer as defined in claim 1 wherein: at least one of said insulative substrates is formed of quartz.

5. A pressure transducer as defined in claim 4, wherein: said frit is comprised of a material with a similar temperature expansion coefficient to that of at least one substrate.

6. A pressure transducer as defined in claims 2, 3, 5 or 3, wherein:

said reference capacitance is substantially equivalent to said sensing capacitance at a minimum pressure value.

7. A pressure transducer as defined in claims 2, 3, 5 or 3, wherein:

said reference capacitance is substantially equivalent to said sensing capacitance at a maximum pressure value.

* * * * *